US011136017B2

(12) United States Patent
Shigeta

(10) Patent No.: US 11,136,017 B2
(45) Date of Patent: Oct. 5, 2021

(54) ELECTRIC BOOSTER

(71) Applicant: HITACHI AUTOMOTIVE SYSTEMS, LTD., Ibaraki (JP)

(72) Inventor: Hiroshi Shigeta, Kai (JP)

(73) Assignee: HITACHI ASTEMO, LTD., Ibaraki (JP)

( * ) Notice: Subject to any disclaimer, the term of this patent is extended or adjusted under 35 U.S.C. 154(b) by 331 days.

(21) Appl. No.: 16/321,902

(22) PCT Filed: Sep. 25, 2017

(86) PCT No.: PCT/JP2017/034519
§ 371 (c)(1),
(2) Date: Jan. 30, 2019

(87) PCT Pub. No.: WO2018/062095
PCT Pub. Date: Apr. 5, 2018

(65) Prior Publication Data
US 2020/0180581 A1  Jun. 11, 2020

(30) Foreign Application Priority Data
Sep. 28, 2016  (JP) .............................. JP2016-189786

(51) Int. Cl.
*B60T 13/74*  (2006.01)
*F16H 25/20*  (2006.01)
*B60T 7/04*  (2006.01)

(52) U.S. Cl.
CPC ............ *B60T 13/745* (2013.01); *F16H 25/20* (2013.01); *B60T 7/042* (2013.01); *F16H 2025/2053* (2013.01)

(58) Field of Classification Search
CPC ...... B60T 13/02; B60T 13/575; B60T 13/745; B60T 13/746; B60T 13/74; F16H 25/20
(Continued)

(56) References Cited

U.S. PATENT DOCUMENTS 9,701,296 B2 *  7/2017  Zhang .................. B60T 13/745
10,647,307 B2 *  5/2020  Yoshizu .................. G01B 7/00
(Continued)

FOREIGN PATENT DOCUMENTS

| CN | 103802813 | 5/2014 |
|---|---|---|
| JP | 2007-191133 | 8/2007 |
| JP | 2008-254586 | 10/2008 |

OTHER PUBLICATIONS

Chinese Office Action dated Jun. 1, 2020 in corresponding Chinese Patent Application No. 201780030170.6 with English translation.
(Continued)

*Primary Examiner* — Christopher P Schwartz
(74) *Attorney, Agent, or Firm* — Wenderoth, Lind & Ponack, L.L.P.

(57) ABSTRACT

An electric booster includes an input member configured to be moved forward or rearward according to an operation on a brake pedal, a thrust force transmission member provided movably relative to the input member, an electric actuator configured to move the thrust force transmission member forward or rearward, and an output member connected to the thrust force transmission member and configured to transmit a thrust force provided from the electric actuator to the thrust force transmission member to a piston of a master cylinder. The electric actuator includes an electric motor, at least two threaded shaft members configured to be rotationally driven by the electric motor, and nut members respectively meshed with the threaded shaft members. Each of the nut members is connected to the thrust force transmission member. The thrust force transmission member is swingably connected to at least one of the nut members and the output member.

5 Claims, 5 Drawing Sheets

(58) Field of Classification Search
USPC .......... 303/114.1, 114.3; 60/547.1, 550, 581, 60/582
See application file for complete search history.

(56) References Cited

U.S. PATENT DOCUMENTS

| | | |
|---|---|---|
| 2007/0199436 A1 | 8/2007 | Ikeda et al. |
| 2012/0090316 A1* | 4/2012 | Philippe ................ B60T 13/745 60/545 |
| 2016/0272184 A1* | 9/2016 | Zhang ................... B60T 13/745 |
| 2016/0280196 A1 | 9/2016 | Zhang |
| 2019/0047531 A1* | 2/2019 | Nagel ................... B60T 13/575 |
| 2019/0389439 A1* | 12/2019 | Panunzio ................ B60T 7/02 |

OTHER PUBLICATIONS

International Search Report dated Dec. 19, 2017 in International (PCT) Application No. PCT/JP2017/034519.

* cited by examiner

ELECTRIC BOOSTER

TECHNICAL FIELD

The present invention relates to an electric booster that uses, as a boosting source, a thrust force generated by an electric actuator.

BACKGROUND ART

For example, PTL 1 discloses an electric booster that transmits a rotational force generated by an electric motor to a ball screw mechanism to convert it into a linear motion thrust force of a thrust force transmission member (a booster piston). Such an electric booster includes a rotation-linear motion conversion mechanism formed by the ball screw mechanism and disposed coaxially with an input rod, and thus is difficult to reduce in size under a restriction due to this layout. One attempt to improve this situation is to employ a rotation-linear motion conversion mechanism configured to operate on a different axis from the input rod, but this configuration raises such a problem that an unnecessary moment and radial load are applied to a linear motion member mainly due to an error in assembling of components, thereby reducing reliability in terms of the operation.

CITATION LIST

Patent Literature

[PTL 1] Japanese Patent Application Public Disclosure No. 2007-191133

SUMMARY OF INVENTION

Technical Problem

The present invention has been made with the object of providing an electric booster capable of ensuring the reliability.

Solution to Problem

According to one aspect of the present invention, an electric booster includes an input member configured to be moved forward or rearward according to an operation on a brake pedal, a thrust force transmission member provided movably relative to the input member, an electric actuator configured to move the thrust force transmission member forward or rearward, and an output member connected to the thrust force transmission member and configured to transmit a thrust force provided from the electric actuator to the thrust force transmission member to a piston of a master cylinder. The electric actuator includes an electric motor, at least two threaded shaft members configured to be rotationally driven by the electric motor, and nut members respectively meshed with the threaded shaft members. Each of the nut members is connected to the thrust force transmission member. The thrust force transmission member is swingably connected to at least one of the nut members and the output member.

Further, according to another aspect of the present invention, an electric booster includes an input member configured to be moved forward or rearward according to an operation on a brake pedal, a thrust force transmission member provided movably relative to the input member, an electric actuator configured to move the thrust force transmission member forward or rearward, and an output member connected to the thrust force transmission member and configured to transmit a thrust force provided from the electric actuator to the thrust force transmission member to a piston of a master cylinder. The electric actuator includes an electric motor, at least two threaded shaft members configured to be rotationally driven by the electric motor, and nut members respectively meshed with the threaded shaft members. Each of the nut members is connected to the thrust force transmission member. The thrust force transmission member is connected to at least one of the nut members and the output member via an elastic member.

Further, according to another aspect of the present invention, an electric booster includes a housing to which a master cylinder is attached, an electric motor mounted on the housing, a rotation-linear motion conversion mechanism configured to be rotationally driven by the electric motor and including a rotational axis at a position different from a central axis of the master cylinder, an output member configured to move a piston of the master cylinder by receiving a linear motion thrust force transmitted from the rotation-linear motion conversion mechanism, and a thrust force transmission member disposed so as to extend over the output member and the rotation-linear motion conversion mechanism while being engaged with the output member and the rotation-linear motion conversion mechanism. The thrust force transmission member is configured to transmit the linear motion thrust force of the rotation-linear motion conversion mechanism to the output member. Any one of the output member and the rotation-linear motion conversion mechanism has a spherical shape at an engagement portion with the output member or the rotation-linear motion conversion mechanism.

According to the aspects of the present invention, the reliably of the electric booster can be ensured.

DESCRIPTION OF EMBODIMENTS

First Embodiment

In the following description, a first embodiment of the present invention will be described with reference to the accompanying drawings.

Figure 1:
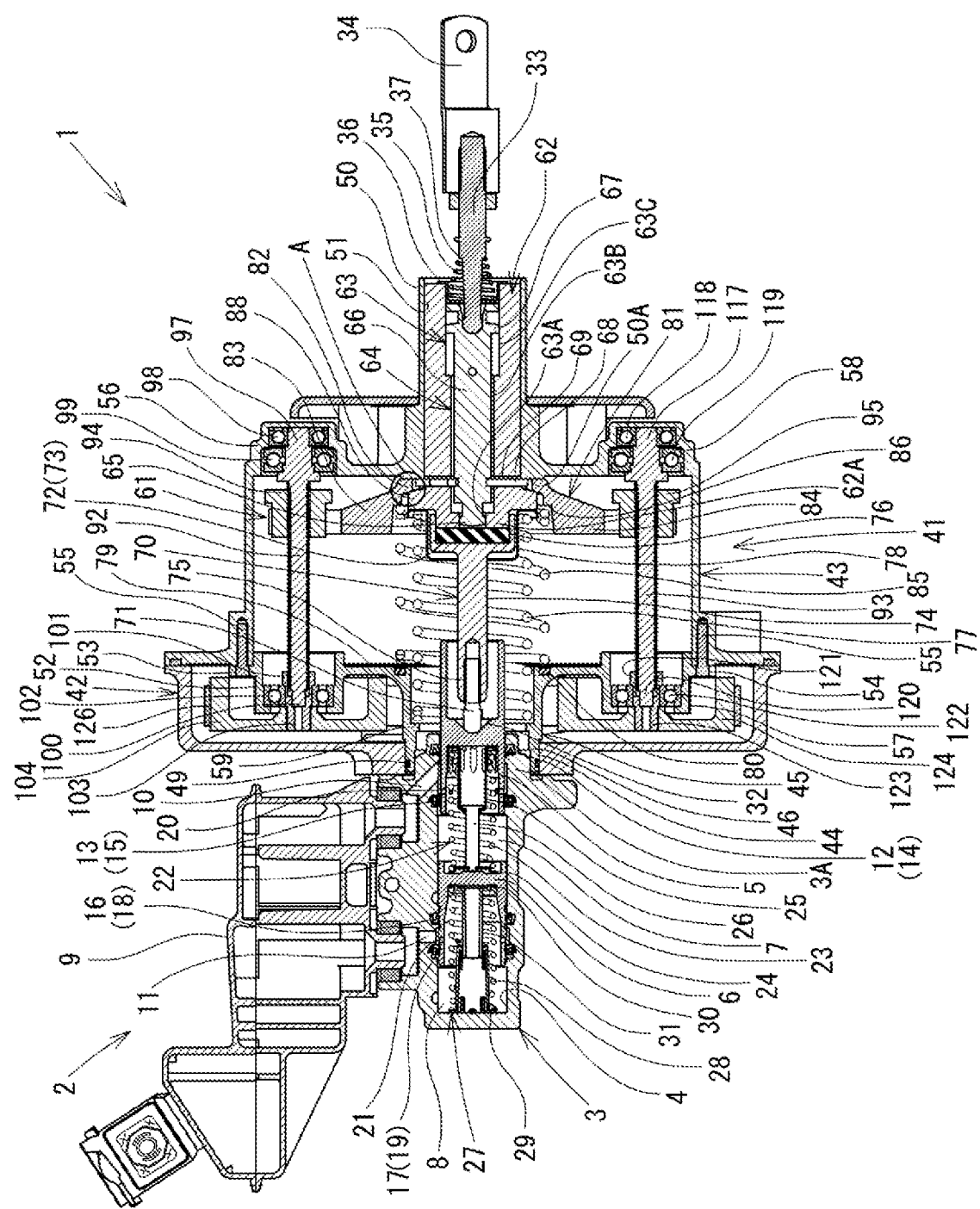
FIG. 1 is a cross-sectional view of a master cylinder coupled with an electric booster according to a first embodiment.

FIG. 1 is a cross-sectional view taken along an axial plane of an electric booster 1 according to the first embodiment. Hereinafter, for convenience, the electric booster 1 will be described defining that a leftward direction and a rightward direction in FIG. 1 correspond to a frontward direction (a front side) and a rearward direction (a rear side) of the electric booster 1, respectively, and an upward direction and a downward direction in FIG. 1 are an upward direction and a downward direction of the electric booster 1, respectively.

A rear end portion of a tandem-type master cylinder 2 is coupled with the electric booster 1. The master cylinder 2 includes a cylinder main body 3 having a bottomed cylinder bore 4 formed therein. A front end portion of a primary piston 5 (a piston), which is formed into a cup-like shape, is inserted in an opening side (a rear side) of the cylinder bore 4. The primary piston 5 is thrust by power generated by the electric booster 1. A rear end portion of the primary piston 5 extends from an opening of the master cylinder 2 into a housing 41 of the electric booster 1. A cup-shaped secondary piston 6 is fittedly inserted in a bottom side (a front side) of the cylinder bore 4. The secondary piston 6 is opened on a front side thereof.

The cylinder main body 3 includes a primary chamber 7 and a secondary chamber 8. The primary chamber 7 is defined by the cylinder bore 4, the primary piston 5, and the secondary piston 6. The secondary chamber 8 is formed between the bottom of the cylinder bore 4 and the secondary piston 6. The primary chamber 7 and the secondary chamber 8 are connected to two systems of hydraulic circuits that supply a working fluid pressure (referred to as a "hydraulic pressure" for convenience) to a wheel cylinder of each of wheels of a vehicle via ports (not illustrated) provided on the cylinder main body 3. The cylinder main body 3 includes a port 10 and a port 11. The port 10 connects the primary chamber 7 to a reservoir 9. The port 11 connects the secondary chamber 8 to the reservoir 9.

Annular seal grooves 12 and 13 are formed on an inner peripheral surface of the cylinder bore 4. The seal grooves 12 and 13 are provided so as to be spaced apart from each other at a predetermined interval in the front-rear direction. Seal rings 14 and 15 are provided in the seal grooves 12 and 13, respectively. The seal rings 14 and 15 seal between the cylinder bore 4 and the primary piston 5. Annular seal grooves 16 and 17 are formed on the inner peripheral surface of the cylinder bore 4. The seal grooves 16 and 17 are provided so as to be spaced apart from each other at a predetermined interval in the front-rear direction. Seal rings 18 and 19 are provided in the seal grooves 16 and 17, respectively. The seal rings 18 and 19 seal between the cylinder bore 4 and the secondary piston 6. In a non-braking state (refer to FIG. 1), the port 10 is opened to between the seal rings 14 and 15, and the port 11 is opened to between the seal rings 18 and 19.

Now, when the primary piston 5 is located at a non-braking position thereof (refer to FIG. 1), the primary chamber 7 is in communication with the reservoir 9 via a port 20 provided on a side wall of the primary piston 5 on the front side thereof and the port 10 of the cylinder main body 3. When the primary piston 5 is moved forward from the non-braking position and the port 20 reaches the seal ring 15, the communication between the primary chamber 7 and the port 10 and thus the communication between the primary chamber 7 and the reservoir 9 are blocked. As a result, a hydraulic pressure in the primary chamber 7 increases. A movement amount of the primary piston 5 from the non-braking position of the primary piston 5 to a position where the communication between the primary chamber 7 and the port 10 (the reservoir 9) is blocked corresponds to a stroke called an invalid stroke.

When the secondary piston 6 is located at a non-braking position thereof (refer to FIG. 1), the secondary chamber 8 is in communication with the reservoir 9 via a port 21 provided on a side wall of the secondary piston 6 on the front side thereof and the port 11 of the cylinder main body 3. When the secondary piston 6 is moved forward from the non-braking position and the port 21 reaches the seal ring 19, the communication between the secondary chamber 8 and the port 11 and thus the communication between the secondary chamber 8 and the reservoir 9 are blocked. As a result, a hydraulic pressure in the secondary chamber 8 increases.

A primary spring assembly 22 is provided between the primary piston 5 and the secondary piston 6. The primary spring assembly 22 determines a distance (an interval) between these pistons 5 and 6 in the non-braking state (refer to FIG. 1). The primary spring assembly 22 includes a compression coil spring 23, an engagement member 24, an engagement member 25, and a shaft member 26. The compression coil spring 23 functions as a return spring. The engagement member 24 is provided in a recessed portion of the secondary piston 6 at a rear end thereof. The engagement member 25 is provided in a recessed portion of the primary piston 5 on the front side thereof. One end of the shaft member 26 is fixed to the engagement member 24, and the other end thereof is restricted from being moved forward and rearward relative to the engagement member 25. The compression coil spring 23 is interposed between the engagement members 24 and 25, and the primary spring assembly 22 can be compressed against a spring force of the compression coil spring 23.

A secondary spring assembly 27 is provided between the secondary piston 6 and the cylinder main body 3. The secondary spring assembly 27 determines a distance (an interval) between the secondary piston 6 and the bottom of the cylinder bore 4 in the non-braking state (refer to FIG. 1). The secondary spring assembly 27 includes a compression coil spring 28, an engagement member 29, an engagement member 30, and a shaft member 31. The compression coil spring 28 functions as a return spring. The engagement member 29 is provided on the bottom of the cylinder bore 4. The engagement member 30 is provided in a recessed portion of the secondary piston 6 on the front side thereof. One end of the shaft member 31 is fixed to the engagement member 30, and the other end thereof is restricted from being moved forward and rearward relative to the engagement member 29. The compression coil spring 28 is interposed between the engagement members 29 and 30, and the secondary spring assembly 27 can be compressed against a spring force of the compression coil spring 28.

The electric booster 1 includes the housing 41 containing a mechanism portion of an electric actuator 61, which will be described below. The housing 41 is configured to be divided into a front housing 42 and a rear housing 43. A hole 44, which is coaxial with the cylinder bore 4 of the master cylinder 2, is provided at a center of the front housing 42. A front end portion of a cylindrical portion 46 of a base member 45, which will be described below, is fitted in the hole 44.

A rear end portion 3A of the cylinder main body 3 of the master cylinder 2 is fitted (press-fitted) on an inner surface of the front end portion of the cylindrical portion 46 of the base member 45. In other words, the front housing 42 is coupled with the cylinder main body 3 of the master cylinder 2 via the cylindrical portion 46 of the base member 45. The cylinder main body 3 of the master cylinder 2 is fixed to the front housing 42 with use of two stud bolts 47 and nuts 48 (refer to FIG. 2) erected on the front housing 42. Further, a seal member 49 seals between the front housing 42 and the cylindrical portion 46 of the base member 45.

A cylindrical portion 50, which is coaxial with the cylinder bore 4 of the master cylinder 2, is provided at a center of the rear housing 43. A generally cylindrical output piston 62 (an output member) is slidably fittedly inserted in a cylinder 51 inside the cylindrical portion 50. An input piston 64 (an input member) is provided inside the output piston 62. The input piston 64 is coaxial with the output piston 62. A spherical front end portion of the input rod 33 is fitted to a rear end portion of the input piston 64, and a rear end portion of the input rod 33 is connected to a brake pedal (not illustrated) via a clevis 34.

The output piston 62 includes an axial hole 63, which includes a small-diameter portion 63A, an intermediate-diameter portion 63B, and a large-diameter portion 63C formed in this order from the master cylinder 2 side (the front side). A spring bearing member 36 is attached to an opening of the axial hole 63 on a rear end surface of the output piston 62, i.e., an opening portion of the large-diameter portion 63C. The input rod 33 is biased rearward relative to the output piston 62 by a compression coil spring 35 interposed between a spring bearing portion 37 formed on the input rod 33 and the spring bearing member 36.

A flange 67 (a rear end portion) of the input piston 64 is slidably fitted to the large-diameter portion 63C of the output piston 62, and a plunger portion 66 of the input piston 64 is inserted through the intermediate portion 63B of the output piston 62. A piston portion 65 of the input piston 64 is slidably fitted to the small-diameter portion 63A of the output piston 62, i.e., a front end portion of the axial hole 63. A stopper 68 is attached to the plunger portion 66 of the input piston 64. The stopper 68 is engaged with a stopper groove 69 formed on the output piston 62. Due to this configuration, the input piston 64 is permitted to be moved relative to the output piston 62 in the front-rear direction by a distance corresponding to a clearance in the front-rear direction between the stopper 68 and the stopper groove 69. Further, the input piston 64 is restricted from being moved rearward relative to the rear housing 43 due to abutment of the stopper 68 against an opening circumferential edge portion 50A on a front side of the cylindrical portion 50 of the rear housing 43 (refer to FIG. 1).

The electric booster 1 includes an output rod 70 that presses (thrusts) the primary piston 5 of the master cylinder 2. The output rod 70 includes a shaft portion 71 and a pressure reception portion 72. A front end of the shaft portion 71 abuts against a cone-shaped bottom portion 32 of a recessed portion of the primary piston 5 on the rear side thereof. The pressure reception portion 72 is coupled with a rear end portion of the shaft portion 71. The pressure reception portion 72 includes a bottomed cylindrical base portion 73 and a support rod 74. The base portion 73 is opened on a rear side thereof. The support rod 74 extends from a center of the base portion 73 frontward (toward the master cylinder 2 side) to support the shaft portion 71. A front end portion 62A of the output piston 62 is slidably fitted inside the base portion 73. The shaft portion 71 and the support rod 74 (the pressure reception portion 72) of the output rod 70 are coupled with each other by a screw 75. In other words, a shaft length (an entire length) of the output rod 70 can be adjusted with use of the screw 75.

A reaction disk 76 made from an elastic material is provided between the output piston 62 and the output rod 70. The reaction disk 76 is contained inside the base portion 73 of the pressure reception portion 72 of the output rod 70, and is sealingly contained by the base portion 73 and the front end portion 62A of the output piston 62. In the non-braking state (refer to FIG. 1), a space called a jump-in clearance is provided between an end surface of the reaction disk 78 on a rear side thereof and a top portion of the input piston 64 having a conically shaped front end portion.

A compression coil spring 77 is interposed between a spring bearing member 78 provided so as to cover the base portion 73 of the pressure reception portion 72 of the output rod 70 and an annular spring bearing portion 59 formed on an inner peripheral surface of the cylindrical portion 46 of the base member 45, and the output piston 62 is biased rearward by the compression coil spring 77. Due to this biasing, the output piston 62 is brought into abutment with a thrust force transmission member 81, which will be described below. An annular seal member 80 seals a space on the master cylinder 2 side (inside the cylindrical portion 46) and a space on the rear housing 43 side (inside the housing 4) opposite of a plate 79 from each other.

As illustrated in FIG. 1, the electric booster 1 includes the thrust force transmission member 81, which transmits a thrust force generated by the electric actuator 61 to the output piston 62. The thrust force transmission member 81 is engaged with the output piston 62 (an output member) and a rotation-linear motion conversion mechanism 60, which will be described below, and is disposed so as to extend over the rotation-linear motion conversion mechanism 60. The thrust force transmission member 81 includes a boss portion 82, and arms 83 and 84 extending from the boss portion 82 upward and downward, respectively. The thrust force transmission member 81 is biased backward by a compression coil spring 85 interposed between a spring bearing portion 86 formed inside the boss portion 82 of the thrust force transmission member 81 and the annular plate 79 attached to a rear end surface of the base member 45. Due to this biasing, a rear end surface 87 (refer to FIG. 3) of the boss portion 82 of the thrust force transmission member 81 is brought into abutment with the opening circumferential edge portion 50A on the front side of the cylindrical portion 50 of the rear housing 43 in the non-braking state (refer to FIG. 1).

Figure 3:
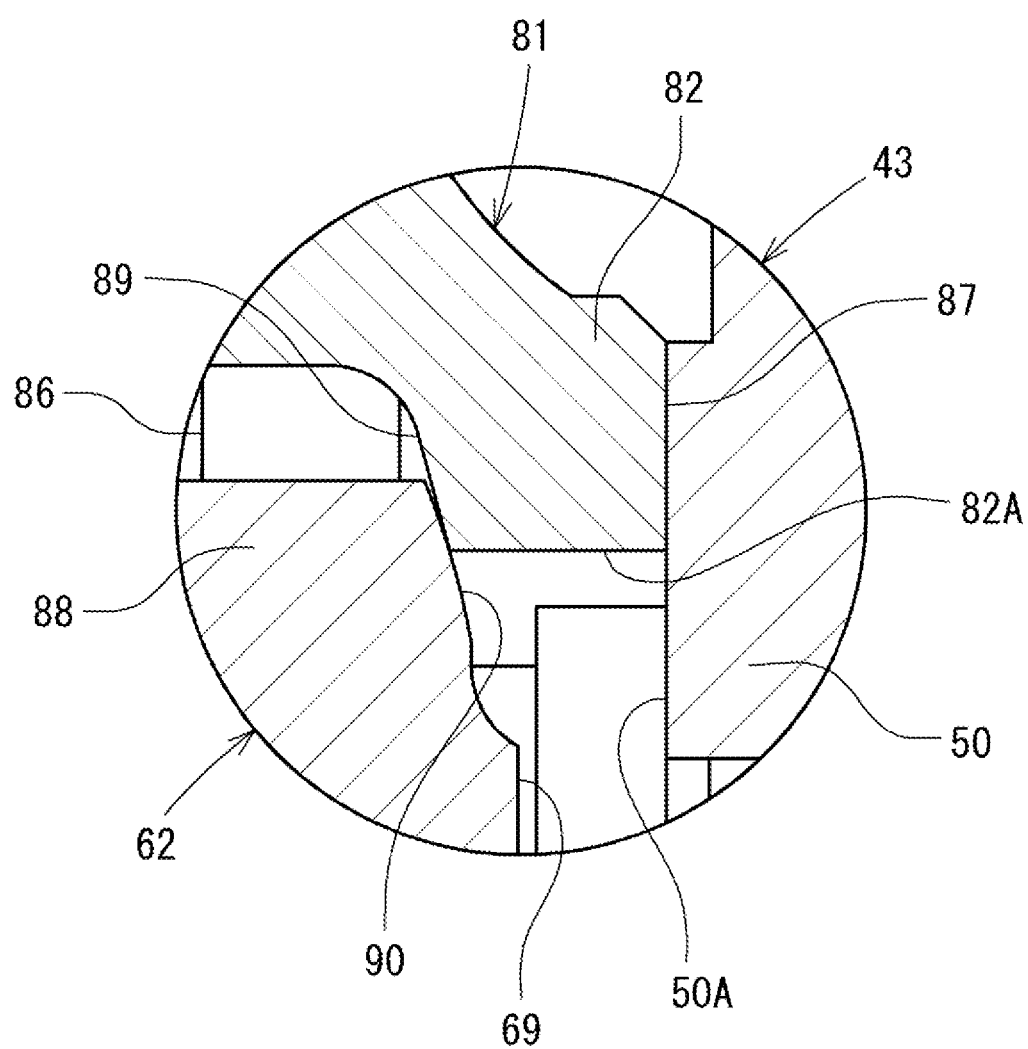
FIG. 3 is an enlarged view of an A portion illustrated in FIG. 1.

As illustrated in FIG. 3, a flange bearing portion 89, which receives a flange portion 88 of the output piston 62, is provided inside the boss portion 82 of the thrust force transmission member 81. The flange bearing portion 89 is provided between an axial hole 82A opened at a rear end surface of the boss portion 82 and the spring bearing portion 86, and is formed by a funnel-shaped inclined surface reducing in diameter toward the rear side. A surface 90 on a rear side of the flange portion 88 of the output piston 62, i.e., an abutment surface 90 of the output piston 62 that abuts against the flange bearing portion 89 of the thrust force transmission member 81 is formed by the surface 90 having a spherical shape, i.e., having an arc-like protruding shape in cross section along an axial plane of the output piston 62. In other words, the output piston 62 abuts, at the spherical abutment surface 90 thereof, against the flange reception portion 89 of the thrust force transmission member 81 (the other member).

As illustrated in FIG. 1, the electric actuator 61 includes an electrically driven motor 91 (refer to FIG. 2) as a motor, and the rotation-linear motion conversion mechanism 60. The rotation-linear motion conversion mechanism 60 converts power (a rotational force) of the electrically driven motor 91 into the thrust force of the thrust force transmission member 81. The rotation-linear motion conversion mechanism 60 includes two threaded shaft members 92 and 93 and nut members 94 and 95. The threaded shaft members 92 and 93 include rotational axes located at positions different from that of a central axis of the master cylinder 2. The nut members 94 and 95 are meshed with the threaded shaft members 92 and 93, respectively. The threaded shaft member 92 is disposed on an upper side with respect to the central axis of the master cylinder 2, and is also disposed in parallel with the central axis of the master cylinder 2. A rear end portion 97 of the threaded shaft member 92 is supported by the rear housing 43 via a radial bearing 98. The rear end portion 97 of the threaded shaft member 92 is supported by the rear housing 43 via a thrust bearing 99. In other words, the rear end portion 97 of the threaded shaft member 92 is rotatably supported by a combination of the radial bearing 98 and the thrust bearing 99 coaxial with the radial bearing 98.

A hub 101 is fixed to a front end portion 100 of the threaded shaft member 92. The hub 101, and thus the front end portion 100 of the threaded shaft member 92 are rotatably supported by the base member 45 via a radial bearing 102. In other words, the threaded shaft member 92 is supported rotatably around the rotational axis of the threaded shaft member 92 by the pair of radial bearings 98 and 102 and the one thrust bearing 99. A driven pulley 104 is relatively non-rotatably attached to a front end portion 103 of the hub 101. In other words, the driven pulley 104 is attached to the front end portion 100 of the threaded shaft member 92 via the hub 101. The radial bearing 102 is contained in a bearing containing portion 52 provided in the base member 45. The radial bearing 98 and the thrust bearing 99 are contained in a bearing containing portion 56 provided in the rear housing 43. An upper end portion 53 and a lower end portion 54 of the base member 45 are fixed to the rear housing 43 by bolts 55.

Figure 4:
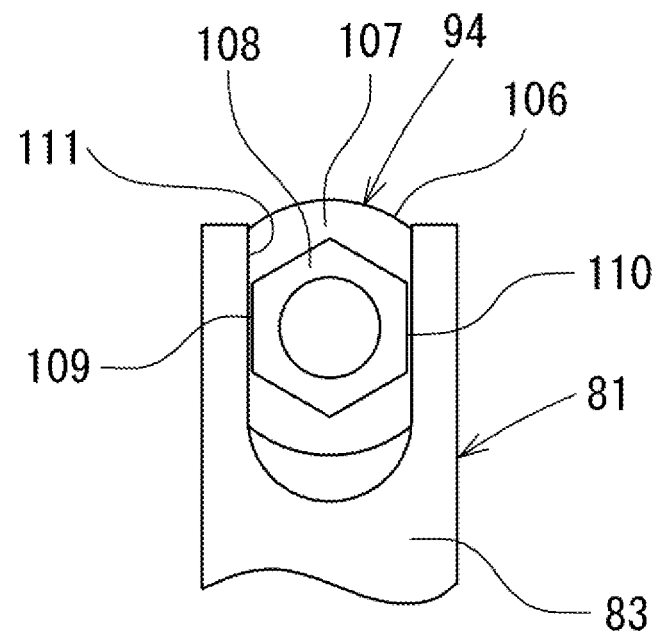
FIG. 4 is a front view illustrating a coupling structure between a thrust force transmission member and a nut member according to the first embodiment.
Figure 5:
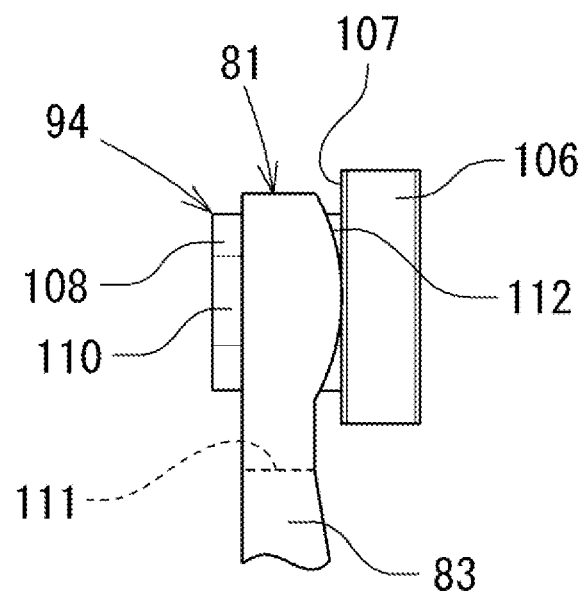
FIG. 5 is a side view illustrating the coupling structure between the thrust force transmission member and the nut member according to the first embodiment.

As illustrated in FIGS. 4 and 5, the nut member 94 is shaped like a flanged hexagonal nut with a flange portion 106 formed at a rear end thereof. A side surface 107 (referred to as a "pressing surface 107" for convenience) of the flange portion 106 on a front side thereof extends in parallel with a plane perpendicular to an axis of the nut member 94 (which coincides with the rotational axis of the threaded shaft member 92), and thus a plane perpendicular to the rotational axis of the threaded shaft member 92. As illustrated in FIG. 4, a pair of surfaces 109 and 110, which defines a bolt width of a hexagonal portion 108 of the nut member 94, is slidably fitted to a groove portion 111 having a constant width that is formed on an upper end portion of the arm 83 of the thrust force transmission member 81. The groove portion 111 extends vertically and is opened at an upper end thereof. In other words, the nut member 94 is movable vertically relative to the thrust force transmission member 81.

As illustrated in FIG. 5, an abutment surface 112 of the thrust force transmission member 81 that abuts against the pressing surface 107 of the flange portion 106 of the nut member 94, i.e., a surface 112 of the thrust force transmission member 81 on a rear side of an upper end portion of the arm 83 is formed into a protruding arc-like shape in cross section along an axial plane of the thrust force transmission member 81. In other words, the thrust force transmission member 81 abuts against the pressing surface 107 of the nut member 94 (the other member) at the abutment surface 112 thereof formed into the protruding arc-like shape in cross section along the axial plane. Therefore, the arm 83 of the thrust force transmission member 81 is slidable and swingable relative to the nut member 94 with the abutment surface 112 of the thrust force transmission member 81 in abutment with the pressing surface 107 of the nut member 94.

As illustrated in FIG. 1, the threaded shaft member 93 is disposed on a lower side with respect to the central axis of the master cylinder 2, and is also disposed in parallel with the threaded shaft member 92. A rear end portion 117 of the threaded shaft member 93 is supported by the rear housing 43 via a radial bearing 118. Further, the rear end portion 117 of the threaded shaft member 93 is supported by the rear housing 43 via a thrust bearing 119. In other words, the rear end portion 117 of the threaded shaft member 93 is rotatably supported by a combination of the radial bearing 118 and the thrust bearing 119 coaxial with the radial bearing 118.

A hub 121 is fixed to a front end portion 120 of the threaded shaft member 93. The hub 121, and thus the front end portion 120 of the threaded shaft member 93 are supported by the base member 45 via a radial bearing 122. In other words, the threaded shaft member 93 is supported rotatably around the rotational axis of the threaded shaft member 93 by the pair of radial bearings 118 and 122 and the one thrust bearing 119. A driven pulley 124 is relatively non-rotatably attached to a front end portion 123 of the hub 121. In other words, the driven pulley 124 is attached to the front end portion 120 of the threaded shaft member 93 via the hub 121. The radial bearing 122 is contained in a bearing containing portion 57 provided in the base member 45. The radial bearing 118 and the thrust bearing 119 are contained in a bearing containing portion 58 provided in the rear housing 43.

The nut member 95 is shaped identically to the above-described nut member 94. Then, a coupling structure between the nut member 95 and the arm 84 of the thrust force transmission member 81 is the same structure as the above-described coupling structure between the nut member 94 and the arm 83 of the thrust force transmission member 81. Therefore, with the aim of simplifying the description of the present specification, descriptions of the nut member 95 and the coupling structure between the nut member 95 and the arm 84 of the thrust force transmission member 81 will be omitted below, and a corresponding configuration will be identified by the same name and the same reference numeral.

As illustrated in FIG. 1, the electric actuator 61 includes a driving pulley (not illustrated), the driven pulley 104, the driven pulley 124, and an endless belt 126. The driving pulley is attached to a rotational shaft of the electrically driven motor 91 (refer to FIG. 2). The driven pulley 104 is attached to the threaded shaft member 92. The driven pulley 124 is attached to the threaded shaft member 93. The endless belt 126 is wound and hung around a tension pulley (not illustrated). Due to this configuration, the power of the electrically driven motor 91 is transmitted to each of the threaded shaft members 92 and 93 via the endless belt 126. The nut members 94 and 95 are prohibited from being rotated relative to the threaded shaft members 92 and 93, respectively, and are moved forward (or rearward) (referred to as "advanced (or retracted)" for convenience) along the threaded shaft members 92 and 93 according to the rotations of the threaded shaft members 92 and 93, respectively. In other words, the power (the rotational force) of the electrically driven motor 91 is converted into the thrust force of each of the nut members 94 and 95.

Then, the abutment surfaces 112 of the arms 83 and 84 of the thrust force transmission member 81 are pressed by the pressing surfaces 107 of the nut members 94 and 95, respectively, by which the thrust force transmission member 81 is thrust (advanced) against the spring force of the compression coil spring 85. In other words, the thrust force of each of the nut members 94 and 95 is transmitted to the thrust force transmission member 81. Further, the abutment surface 90 of the flange portion 88 of the output piston 62 is pressed by the flange reception portion 89 of the thrust force transmission member 81, by which the output piston 62 is thrust (advanced) against the spring force of the compression coil spring 77. In other words, the thrust force of the thrust force transmission member 81 is transmitted to the output piston 62. Then, the thrust force of the output piston 62 is transmitted to the output rod 70 via the reaction disk 76.

Figure 2:
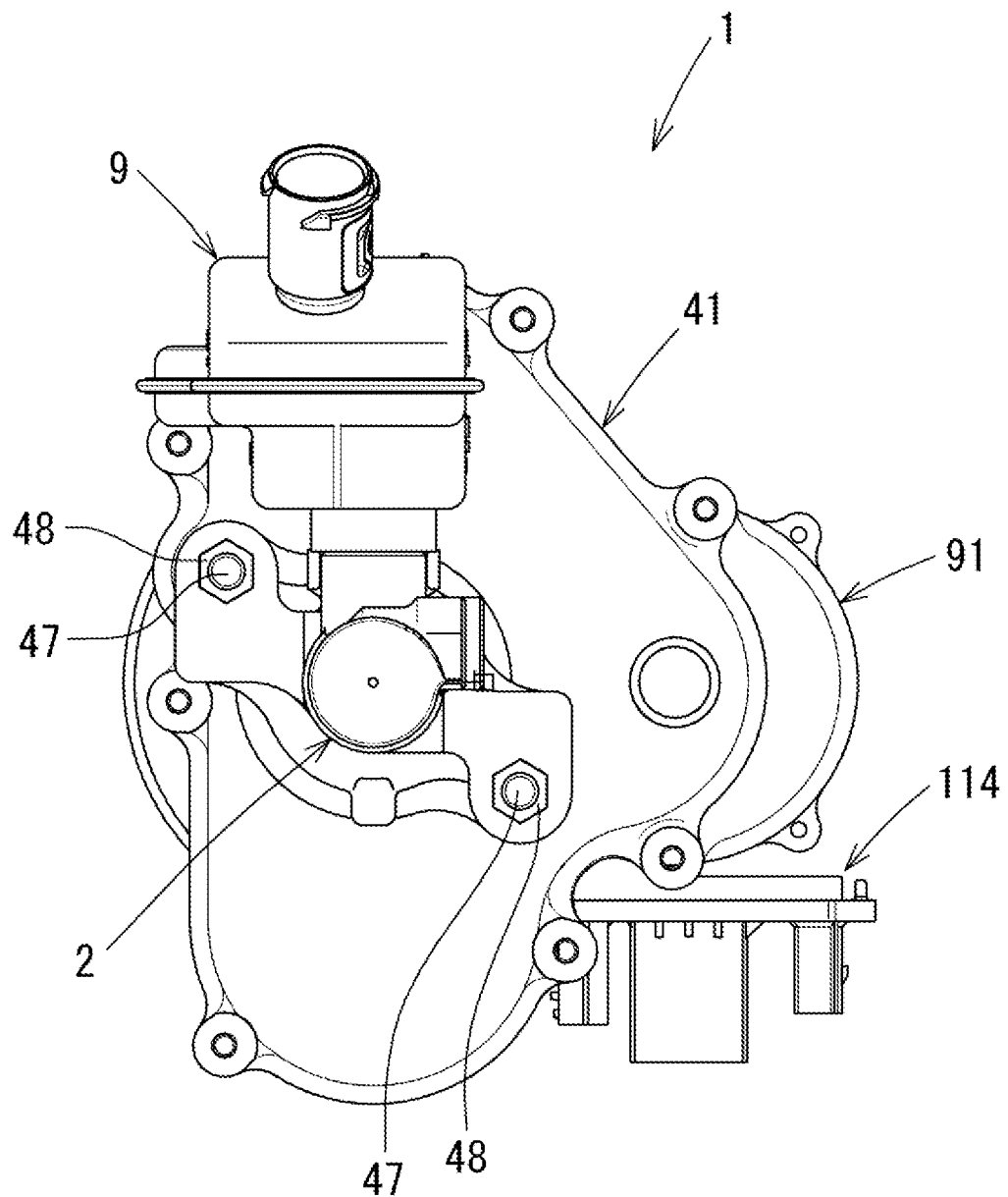
FIG. 2 is a side view of the master cylinder coupled with the electric booster according to the first embodiment.

In the first embodiment, a screw formed on each of the threaded shaft members 92 and 93 is a trapezoidal screw. Further, as illustrated in FIG. 2, the electric booster 1 includes an electronic control unit 114 (referred to as an "ECU 114" for convenience) for controlling the electrically driven motor 91.

In the electric booster 1 according to the first embodiment, the input rod 33 is advanced against the biasing force of the compression coil spring 35 when the brake pedal is operated. An operation amount on the brake pedal at this time, i.e., a displacement of the input rod 33 is detected by a stroke sensor or the like. Then, the ECU 114 controls the electrically driven motor 91 (the electric motor) of the electric actuator 61 based on the displacement of the input rod 33, thereby thrusting (advancing) each of the nut members 94 and 95 and thus the thrust force transmission member 81. The thrust force of the thrust force transmission member 81 is transmitted to the primary piston 5 via the output piston 62 (the output member), the reaction disk 76, and the output rod 70.

Due to this configuration, when the primary piston 5 is advanced, the ECU 114 controls the electrically driven motor 91 in such a manner that the movement amount of the primary piston 5 follows the displacement of the input rod 33, i.e., the operation amount on the brake pedal. The advancement of the primary piston 5 causes an increase in the hydraulic pressure in the primary chamber 7, and this hydraulic pressure is transmitted to the secondary chamber 8 via the secondary piston 6. Then, the hydraulic pressure generated in the master cylinder 2 is supplied to the wheel cylinder of each of the wheels of the vehicle via the two systems of hydraulic circuits, thereby generating a braking force by frictional braking. A reaction force derived from the hydraulic pressure in the master cylinder 2 that is generated at the time of this braking is transmitted to the input piston 64 (an input member) and the output piston 62 via the primary piston 5, the output rod 70, and the reaction disk 76. Then, a desired braking force can be generated with a boosting ratio (a ratio of the hydraulic output to the operation input on the brake pedal) obtained based on a ratio between a pressure reception area of the front end surface of the output piston 62 and a pressure reception area of the piston portion 65 of the input piston 64.

When the operation on the brake pedal is released, the ECU 114 controls the electrically driven motor 91 based on the displacement of the input rod 33, thereby retracting each of the nut members 94 and 95 and thus the thrust force transmission member 81. According thereto, the primary piston 5 and the secondary piston 6 are retracted via the output piston 62, the reaction disk 76, and the output rod 70, so that the hydraulic pressure in the master cylinder 2 reduces and the braking force is released.

Now, if the ball screw mechanism is employed for the rotation-linear motion conversion mechanism 60 as discussed in the above-described patent literature, PTL 1, this makes the apparatus (the electric actuator) expensive. One attempt to address this situation is to employ the rotation-linear motion conversion mechanism 60 configured to operate on a different axis from the input rod instead of the ball screw mechanism, but this attempt raises the problem of the reduction in the reliability in terms of the operation. One of causes therefor is that an unnecessary moment and radial load are applied to the linear motion member mainly due to an error in the assembling of components.

To solve this problem, the first embodiment allows an offset load applied to the output piston 62 due to an error in assembling of the electric actuator 61 to be absorbed by swinging the flange reception portion 89 of the thrust force transmission member 81 relative to the abutment surface 90 of the output piston 62, thereby succeeding in preventing or reducing generation of the unnecessary moment and radial load on the threaded shaft members 94 and 95 when the power of the electrically driven motor 91 is transmitted. As a result, the first embodiment can prevent transmission efficiency from reducing and the nut members 94 and 95 from being stuck to the threaded shaft members 92 and 93, thereby providing the electric booster 1 highly reliable in terms of the operation.

Having described the first embodiment in detail, advantageous effects of the first embodiment will be described now.

The first embodiment is an electric booster including an input member configured to be moved forward or rearward according to an operation on a brake pedal, a thrust force transmission member provided movably relative to the input member, an electric actuator configured to move the thrust force transmission member forward or rearward, and an output member connected to the thrust force transmission member and configured to transmit a thrust force provided from the electric actuator to the thrust force transmission member to a piston of a master cylinder. The electric actuator includes an electric motor, at least two threaded shaft members configured to be rotationally driven by the electric motor, and nut members respectively meshed with the threaded shaft members. Each of the nut members is connected to the thrust force transmission member. The thrust force transmission member is swingably connected to at least one of the nut members and the output member. Therefore, the first embodiment makes it possible to absorb an offset load applied to the output member due to a positional difference between the nut members in a front-rear direction due to an error in assembling of the electric actuator. Due to this effect, the first embodiment can prevent the transmission efficiency from reducing and the nut members from being stuck to the threaded shaft members without the unnecessary moment and radial load generated on the threaded shaft members when the power of the electric motor is transmitted. As a result, the first embodiment can provide the electric booster highly reliable in terms of the operation.

The first embodiment employs the rotation-linear motion conversion mechanism having the rotational axis located at the different position from the position of the central axis of the master cylinder, and thus can improve layout flexibility compared to the conventional technique employing one ball screw mechanism for the rotation-linear motion conversion mechanism, thereby reducing the size of the electric actuator and thus the size of the electric booster. In addition, the first embodiment allows the electric booster 1 to use the threaded shaft member having the affordable trapezoidal screw instead of the expensive ball screw, thereby reducing manufacturing cost of the electric actuator and thus manufacturing cost of the electric booster.

The first embodiment causes the output member to swingably abut against the thrust force transmission member at the abutment surface having the arc-like protruding shape in cross section, thereby making it possible to absorb the offset load applied to the output member due to the positional difference between the nut members in the front-rear direction due to the error in the assembling of the electric actuator by causing the thrust force transmission member to swing relative to the abutment surface of the output member. Due to this effect, the first embodiment can prevent or reduce the unnecessary moment and radial load from being generated on the threaded shaft members, thereby preventing the transmission efficiency from reducing and the nut members from being stuck to the threaded shaft members when the power of the electric motor is transmitted. As a result, the first embodiment can provide the electric booster highly reliable in terms of the operation.

In the first embodiment, each of the nut members is connected vertically movably relative to the thrust force transmission member. The abutment surface of the thrust force transmission member that abuts against each of the nut members is formed into the protruding arc-like shape in cross section along the axial plane of the thrust force transmission member. Each of the protruding abutment surfaces of the thrust force transmission member is brought into swingable abutment with the pressing surface of each of the nut members. Therefore, the first embodiment makes it possible to absorb the above-described offset load applied to the output member due to the positional difference between the nut members in the front-rear direction due to the error in the assembling of the electric actuator by causing each of the corresponding abutment surfaces of the thrust force transmission member to swing relative to the pressing surface of each of the nut members. Due to this effect, the first embodiment can prevent or reduce the unnecessary moment and radial load from being generated on the threaded shaft members when the power of the electric motor is transmitted.

Having described the first embodiment, in the first embodiment, the funnel-shaped inclined surface (refer to FIG. 3) is formed on the flange reception portion 89 of the thrust force transmission member 81, and the spherical abutment surface 90 (having the arc-like protruding shape in cross section) is formed on the flange portion 88 of the output piston 62. On the other hand, the electric booster 1 may be configured in such a manner that the funnel-shaped inclined surface is formed on the flange portion 88 of the output piston 62, and the spherical abutment surface 90 is formed on the flange reception portion 89 of the thrust force transmission member 81, thereby being configured to cause the spherical abutment surface 90 of the thrust force transmission member 81 to slidably abut against the funnel-shaped flange portion 88 of the output piston 62.

Further, in the first embodiment, the abutment surface 112 of the thrust force transmission member 81 that abuts against the pressing surface 107 of the flange portion 106 of each of the nut members 94 and 95 is formed into the protruding arc-like shape in cross section along the axial plane of the thrust force transmission member 81. However, the electric booster 1 can be configured in such a manner that the pressing surface 107 of each of the nut members 94 and 95 is spherically shaped, thereby being configured to cause the spherical pressing surface 107 of each of the nut members 94 and 95 to swingably abut against the flat abutment surface 112 of corresponding each of the arms 83 and 84 of the thrust force transmission member 81.

In other words, in the engagement portions of the output member and the rotation-linear motion conversion mechanism with the thrust force transmission member, any one of the abutment surface 90 of the flange portion 88 of the output piston 62 and the pressing surface 107 of the flange portion 106 of each of the nut members 94 and 95 can be spherically shaped.

Second Embodiment

Figure 6:
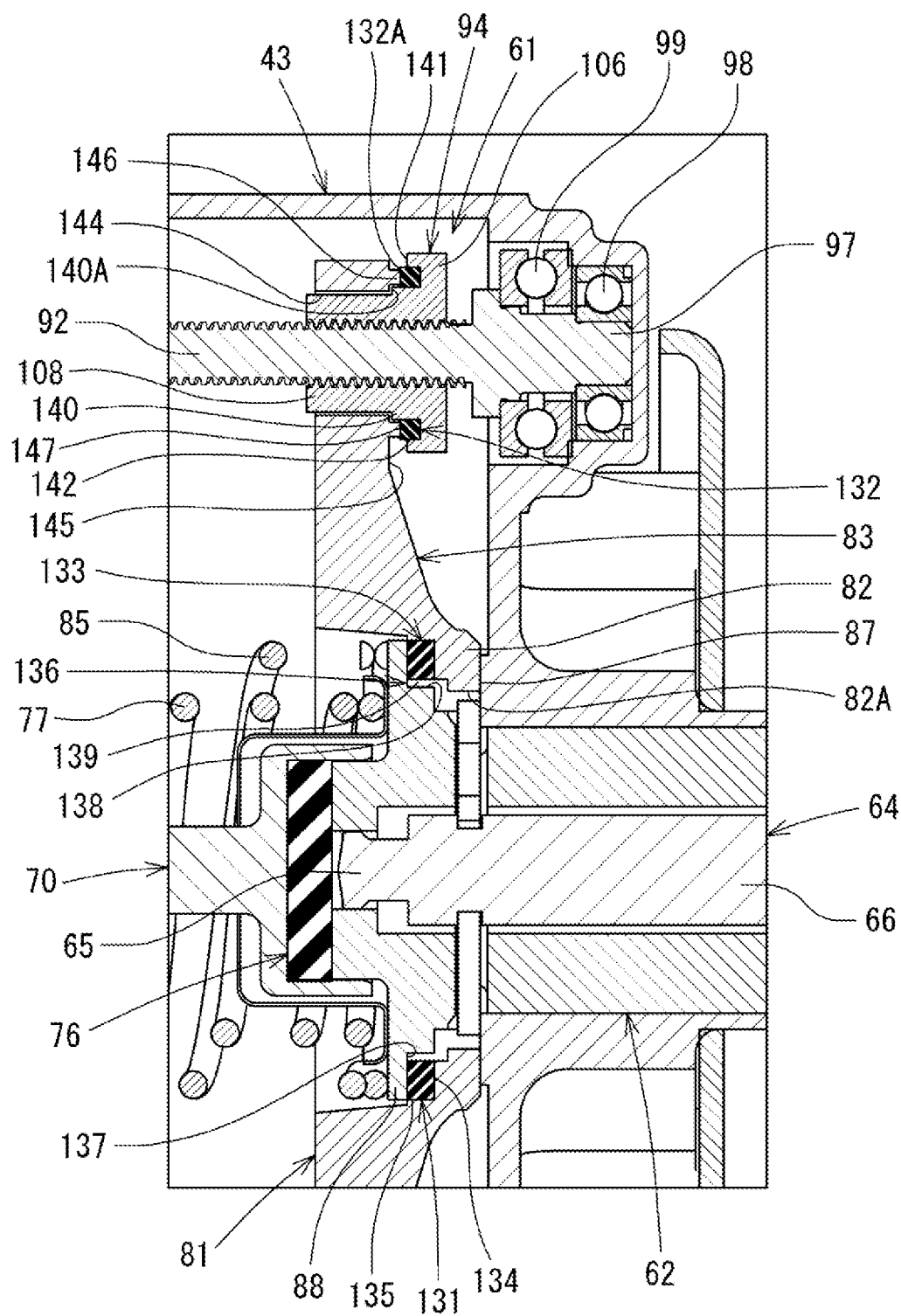
FIG. 6 is a cross-sectional view of a master cylinder coupled with an electric booster according to a second embodiment.

Next, a second embodiment will be described mainly focusing on differences from the first embodiment with reference to FIG. 6. Now, FIG. 6 is a cross-sectional view of engagement portions of the output member and the rotation-linear motion conversion mechanism with the thrust force transmission member according to the second embodiment. Portions in common with the first embodiment will be identified by the same names and the same reference numerals.

As illustrated in FIG. 6, in the second embodiment, the output piston 62 (the output member) and the thrust force transmission member 81 are connected to each other via an elastic member 131, and the nut members 94 and 95 (the rotation-linear motion conversion mechanism 60) and the thrust force transmission member 81 are connected to each other via an elastic member 132. The other portions are similar to the first embodiment. Further, the nut member 94 and the nut member 95 are components shaped identically to each other, and therefore the illustration of the nut member 95 will be omitted here.

The axial hole 82A of the boss portion 82 of the thrust force transmission member 81 according to the second embodiment is a stepped hole having a diameter increasing in a stepwise manner from the rear end surface 87 side toward the front side. A hole of the stepped hole at a front end thereof is used as a groove portion 133 that contains the elastic member 131 rectangular in cross section along the axial plane. More specifically, the groove portion 133 includes an annular reception surface 134 that receives a rear end surface of the elastic member 131, and an annular reception surface 135 that receives an outer peripheral surface of the elastic member 131.

The output piston 62 includes a groove portion 136 formed at a corner portion on a rear side of an outer circumferential edge portion of the flange portion 88. An abutment surface 137 is formed on the groove portion 136. The abutment surface 137 abuts against a front end surface of the elastic member 131 attached in the groove portion 133, i.e., faces the reception surface 134 of the groove portion 133 with a predetermined interval generated therebetween. A relief surface 138 is formed on the groove portion 136. The relief surface 138 has a predetermined interval from an inner peripheral surface of the elastic member 131 with the abutment surface 137 in abutment with the front end surface of the elastic member 131 (refer to FIG. 6). More specifically, a predetermined space 139 is formed between the relief surface 138 of the groove portion 136 and the inner peripheral surface of the elastic member 131. A height (a length in the front-rear direction) of the relief surface 138 is set to a slightly shorter than a thickness of the elastic member 131 (a height of the reception surface 135).

The flange portion 106 of the nut member 94 according to the second embodiment is formed into a stepped shape with a boss portion 140 provided on a front side thereof. An annular groove portion 142 is provided on an inner peripheral portion of a front end surface 141 of the flange portion 106 so as to surround the boss portion 140. The annular elastic member 132 is attached to the groove portion 142. The elastic member 132 is formed into a rectangular shape in cross section, and a front end surface 132A is positioned between a front end surface 140A of the boss portion 140 and the front end surface 141 of the flange portion 106 in the front-rear direction (the axial direction). In other words, the front end surface 132A of the elastic member 132 is positioned on the front side with respect to the front end surface 141 of the flange portion 106.

A hexagonal hole 144 is formed in the arm 83 of the thrust force transmission member 81 according to the second embodiment instead of the groove portion 111 (refer to FIG. 4), and the hexagonal portion 108 of the nut member 94 is inserted in the hexagonal hole 144. Fitted engagement between the hexagonal hole 144 and the hexagonal portion 108 is set so as to allow rattling caused by the positional difference between the nut members 94 and 95 in the front-rear direction due to the error in the assembling of the electric actuator 61. An annular protruding portion 146 provided around the hexagonal hole 144 is formed on the rear-side surface 145 of the arm 83 of the thrust force transmission member 81.

As illustrated in FIG. 6, an inner peripheral surface of the annular protruding portion 146 faces an outer peripheral surface of the boss portion 140 of the nut member 94 with a predetermined space generated therebetween. An annular abutment surface 147 is formed on the annular protruding portion 146. The abutment surface 147 is brought into abutment with the front end surface 132A of the elastic member 132. A space for allowing rattling between the threaded shaft member 92 and the nut member 94 with the abutment surface 147 in abutment with the front end surface 132A of the elastic member 132 is formed between the rear-side surface 145 of the arm 83 of the thrust force transmission member 81 and the front end surface of the boss portion 140 of the nut member 94.

Then, similarly to the first embodiment, a connection structure between the nut member 95 and the arm 84 of the thrust force transmission member 81 according to the second embodiment is the same structure as the above-described connection structure between the nut member 94 and the arm 83 of the thrust force transmission member 81 via the elastic member 132. Therefore, with the aim of simplifying the description of the present specification, descriptions of the nut member 95 and the connection structure between the nut member 95 and the arm 84 of the thrust force transmission member 81 will be omitted below, and a corresponding configuration will be identified by the same name and the same reference numeral.

In this manner, in the second embodiment, the output piston 62 (the output member) and the thrust force transmission member 81 are connected to each other via the elastic member 131. More specifically, the output piston 62 and the thrust force transmission member 81 are connected to each other with the abutment surface 137 of the output piston 62 in abutment with the elastic member 131 attached in the groove portion 133 of the thrust force transmission member 81. Therefore, by deforming the elastic member 131 when the electric actuator 61 is in operation, the second embodiment makes it possible to absorb the offset load applied to the output piston 62 due to the positional difference between the nut members 94 and 95 in the front-rear direction due to the error in the assembling of the electric actuator 61.

Further, in the second embodiment, each of the nut members 94 and 95 (the rotation-linear motion conversion mechanism) and the thrust force transmission member 81 are connected to each other via the elastic member 132. More specifically, each of the nut members 94 and 95 and the thrust force transmission member 81 are connected to each other with the abutment surface 147 of each of the arms 83 and 84 of the thrust force transmission member 81 in abutment with the elastic member 132 attached to each of the nut members 94 and 95. Therefore, by deforming the elastic member 132 when the electric actuator 61 is in operation, the second embodiment makes it possible to absorb the offset load applied to the output piston 62 due to the positional difference between the nut members 94 and 95 in the front-rear direction due to the error in the assembling of the electric actuator 61.

As a result, the second embodiment can prevent the transmission efficiency from reducing and the nut members 94 and 95 from being stuck to the threaded shaft members 92 and 93, thereby providing the electric booster 1 highly reliable in terms of the operation.

In the second embodiment, the output piston 62 (the output member) and the thrust force transmission member 81 are connected to each other via the elastic member 131 while each of the nut members 94 and 95 (the rotation-linear motion conversion mechanism) and the thrust force transmission member 81 are connected to each other via the elastic member 132, but the thrust force transmission member 81 may be configured to be connected to at least one of the output member 62 and the nut members 94 and 95 via the elastic member 131 or the elastic member 132.

Further, the elastic member 131 is attached to the thrust force transmission member 81, but the electric booster 1 may be configured in such a manner that the elastic member 131 is attached to the output piston 62. Similarly, the elastic member 132 is attached to each of the nut members 94 and 95, but the electric booster 1 may be configured in such a manner that the elastic member 132 is attached to the thrust force transmission member 81.

Having described several embodiments of the present invention, the above-described embodiments of the present invention are intended to only facilitate the understanding of the present invention, and are not intended to limit the present invention thereto. The present invention can be modified or improved without departing from the spirit of the present invention, and includes equivalents thereof. Further, the individual components described in the claims and the specification can be arbitrarily combined or omitted within a range that allows them to remain capable of achieving at least a part of the above-described objects or producing at least a part of the above-described advantageous effects.

The present application claims priority to Japanese Patent Application No. 2016-189786 filed on Sep. 28, 2016. The entire disclosure of Japanese Patent Application No. 2016-189786 filed on Sep. 28, 2016 including the specification, the claims, the drawings, and the abstract is incorporated herein by reference in its entirety.

REFERENCE SIGN LIST 1 electric booster
2 master cylinder
5 primary piston (piston)
61 electric actuator
62 output piston (output member)
64 input piston (input member)
81 thrust force transmission member
91 electrically driven motor (electric motor)
92, 93 threaded shaft member
94, 95 nut member

The invention claimed is:

1. An electric booster comprising:
an input member configured to be moved forward or rearward according to an operation on a brake pedal;
a thrust force transmission member provided movably relative to the input member;
an electric actuator configured to move the thrust force transmission member forward or rearward; and
an output member connected to the thrust force transmission member and configured to transmit a thrust force provided from the electric actuator to the thrust force transmission member to a piston of a master cylinder,
wherein the electric actuator includes
an electric motor,
at least two threaded shaft members configured to be rotationally driven by the electric motor, and
nut members respectively meshed with the threaded shaft members, each of the nut members being connected to the thrust force transmission member, and
wherein the thrust force transmission member is swingably connected to at least one of the nut members and the output member.

2. The electric booster according to claim 1, wherein one of the thrust force transmission member and the output member abuts against the other of the thrust force transmission member and the output member at a portion of a surface having an arc-like protruding shape in cross section along an axial plane.

3. The electric booster according to claim 2, wherein a central line of each of the threaded shaft members extends in parallel with a central line of the output member and is disposed in the same plane as the central line of the output member.

4. The electric booster according to claim 1, wherein one of the thrust force transmission member and the nut member abuts against the other of the thrust force transmission member and the nut member at a portion of a surface having an arc-like protruding shape in cross section along an axial plane.

5. The electric booster according to claim 1, wherein a central line of each of the threaded shaft members extends in parallel with a central line of the output member and is disposed in the same plane as the central line of the output member.

* * * * *